UNITED STATES PATENT OFFICE.

JOSEPH KOETSCHET, OF LYON, AND MAX THEUMANN, OF ST. FONS, FRANCE, ASSIGNORS TO SOCIETE CHIMIQUE DES USINES DU RHONE (ANCIENNEMENT GILLIARD, P. MONNET ET CARTIER), OF PARIS, FRANCE.

MANUFACTURE OF CELLULOSE DERIVATIVES.

1,216,462.      Specification of Letters Patent.      Patented Feb. 20, 1917.

No Drawing.      Application filed June 19, 1915. Serial No. 35,071.

*To all whom it may concern:*

Be it known that we, JOSEPH KOETSCHET, of 24 Quai Claude Bernard, Lyon, France, a citizen of the Swiss Republic, and MAX THEUMANN, of St. Fons, Rhône, France, a citizen of the French Republic, have invented certain new and useful Improvements in or Relating to the Manufacture of Cellulose Derivatives, of which the following is a specification.

The present invention has for its subject a process for the manufacture of new cellulose derivatives. This process consists in causing anhydrids of the fatty series to act, with or without a catalyzer, upon cellulose or its derivatives in presence of trioxymethylene or formaldehyde and more generally in presence of aldehydes of the fatty series, their polymers or derivatives.

The process allows of obtaining products which in appropriate solvents give solutions which are both viscous and clear and lend themselves admirably to the obtainment of films and varnishes and to the preparation of substitutes for celluloid, caoutchouc, etc.

We give below, by way of example, one practical form of the process in which the method of working described in the specification of U. S. American application for patent filed 18 June, 1914, S. No. 845,856, is adopted.

10 parts of cellulose are brought into contact with a mixture of:

60 parts glacial acetic acid,
4 parts acetic anhydrid,
0.5 parts 100% sulfuric acid,
1 part trioxymethylene.

The cellulose is rapidly attacked, loses its texture and forms with the liquid mixtures a very fluid mass. The mass is maintained at a temperature of about 30° C. for some hours, and then 21 parts of acetic anhydrid are added.

The acetylation proceeds very rapidly; the cellulose modified by the preliminary treatment dissolves very quickly, becoming transformed into an extremely viscous product capable of giving very clear solutions.

On precipitating with water a product is obtained which in the usual solvents of cellulose acetate gives solutions having the properties above indicated.

If, instead of precipitating the acetylation product direct, one saponifies same partially in the solution before precipitating, new deacetylation products are readily obtained, some of which are soluble in acetone.

It is evident that the invention is not limited to the above example, nor to the esterification of the cellulose in two phases. The invention in fact is applicable to any process of esterification of cellulose and its derivatives.

What I claim and desire to secure by Letters Patent is:—

1. Process for the manufacture of cellulose derivatives by the action of anhydrids of the fatty series, with a catalyzer, upon cellulose or its derivatives, said process being characterized in that the reaction is performed in presence of trioxymethylene or formaldehyde.

2. Process for the manufacture of a cellulose derivative, comprising subjecting cellulose or a cellulose derivative to treatment with an anhydrid of the fatty acid series in presence of sulfuric acid and of trioxymethylene.

3. Process for the manufacture of a cellulose derivative, comprising subjecting cellulose or a cellulose derivative to a preliminary treatment with an acid of the fatty acid series and an anhydrid of the fatty acid series in presence of a catalyzer and trioxymethylene and subjecting the resulting mass to esterification with a further quantity of anhydrid of the fatty acid series.

4. Process for the manufacture of a cellulose derivative, comprising subjecting cellulose or a cellulose derivative to a preliminary treatment with an acid of the fatty acid series and an anhydrid of the fatty acid series in presence of formaldehyde and a catalyzer, and subjecting the resulting mass to esterification with a further quantity of anhydrid of the fatty acid series.

5. Process for the manufacture of a cellulose derivative, comprising subjecting cellulose or a cellulose derivative to treatment with acetic acid and acetic anhydrid in presence of trioxymethylene and a catalyzer.

6. Process for the manufacture of a cellulose derivative, comprising subjecting cellulose or a cellulose derivative to treatment with glacial acetic acid and acetic anhydrid in presence of trioxymethylene and sulfuric acid.

7. Process for the manufacture of a cellulose derivative, comprising subjecting cellulose or a cellulose derivative to a preliminary treatment with acetic acid, and acetic anhydrid, in presence of trioxymethylene and a catalyzer and subjecting the resulting mass to acetylating treatment with a further quantity of acetic anhydrid.

8. Process for the manufacture of a cellulose derivative, comprising subjecting cellulose or a cellulose derivative to treatment with an acid of the fatty acid series and an anhydrid of the fatty acid series and a catalyzer, in presence of trioxymethylene and precipitating the resulting cellulose derivative.

9. Process for the manufacture of a cellulose derivative, comprising subjecting cellulose or a cellulose derivative to treatment with an acid of the fatty acid series and an anhydrid of the fatty acid series and a catalyzer in presence of trioxymethylene partially saponifying the resulting cellulose derivative in solution and precipitating the partially saponified derivative.

10. Process for the manufacture of a cellulose derivative, comprising subjecting cellulose or a cellulose derivative to treatment with an acid of the fatty acid series and an anhydrid of the fatty acid series and a catalyzer, in presence of formaldehyde and precipitating the resulting cellulose derivative.

11. Process for the manufacture of a cellulose derivative, comprising subjecting cellulose or a cellulose derivative to treatment with an acid of the fatty acid series and an anhydrid of the fatty acid series and a catalyzer in presence of formaldehyde partially saponifying the resulting cellulose derivative in solution and precipitating the partially saponified derivative.

In testimony whereof we have signed our names to this specification in the presence of two subscribing witnesses.

JOSEPH KOETSCHET.
MAX THEUMANN.

Witnesses:
JOHN J. ERNSTER,
MARIN VACHON.